March 7, 1950      F. A. HART      2,499,994
DOUBLE WEDGE LOCK FOR INSERTED BLADE CUTTERS
Filed Nov. 27, 1946      2 Sheets-Sheet 1
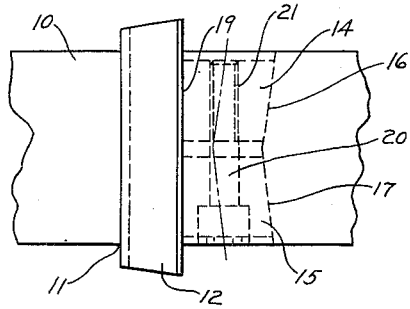
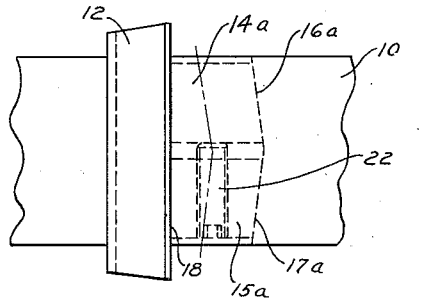
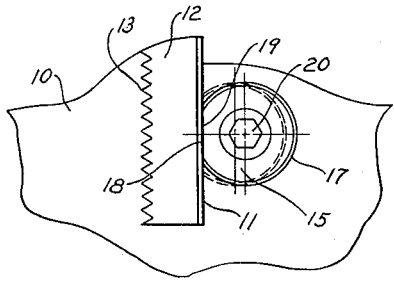
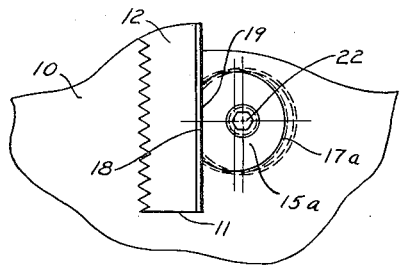
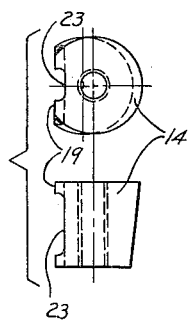
Frank A. Hart
*INVENTOR.*
BY Philip S. McLean
*ATTORNEY.*

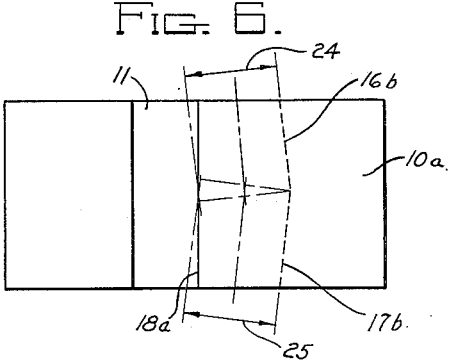
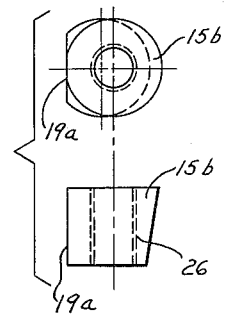
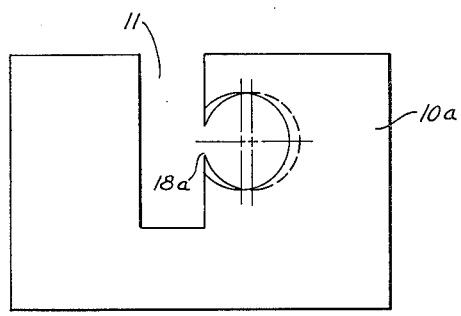
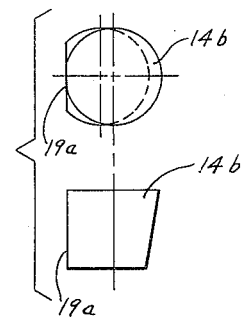

Patented Mar. 7, 1950

2,499,994

UNITED STATES PATENT OFFICE 2,499,994

DOUBLE WEDGE LOCK FOR INSERTED BLADE CUTTERS

Frank A. Hart, Rhinebeck, N. Y.

Application November 27, 1946, Serial No. 712,691

8 Claims. (Cl. 29—105)

The invention here disclosed relates to inserted blade cutters such as milling cutters and the like.

Special objects of the invention are to provide simple, inexpensive and readily produced means for positively and firmly securing the cutter blades and which while easily operated to effect gripping or release of the blades, will exert powerful and substantially uniform holding pressure.

Other desirable objects are to provide an inserted blade cutter structure which will consist of but few parts, and those of rugged, durable construction.

Other desirable objects and the novel features through which the purposes of the invention are attained are set forth or will appear in the course of the following specification.

The drawings accompanying and forming part of the specification illustrate certain present practical embodiments of the invention. Structure, however, may be modified and changed as regards the present illustrations, all within the true intent and broad scope of the invention as hereinafter defined and claimed.

Fig. 1 in the drawings is a broken plan view of a milling cutter showing one blade section of a milling cutter having the invention incorporated therein;

Fig. 2 is a broken side elevation of the same;

Figs. 3 and 4 are views similar to Figs. 1 and 2, illustrating a modified form of the invention;

Fig. 5 is an opposite view illustrating in plan and side elevation a modified form of wedge block;

Figs. 6 and 7 are plan and side views, respectively, of a cutter block or body constructed on the order of the milling cutter shown in Figs. 3 and 4;

Figs. 8 and 9 are composite views of the wedge blocks used in the last illustrated form of the invention.

In Figs. 1 and 2 a portion of the body of a milling cutter is indicated at 10 slotted inwardly at 11 to seat the inserted cutter blade 12, interlocking of blade and support being effected by companion toothed formation at 13.

Opposed, oppositely facing, inwardly tapered, generally circular wedges 14, 15, entered from opposite sides of the cutter body, bear against the front of the blade and hold it positively locked in place.

The inwardly convergent cylindrical bores 16, 17, for the relatively inclined cylindrical tapered wedge blocks correspond in shape and open at 18 to the cutter slot, across the full width of the same, to admit the flattened side portions 19 into clamping engagement with the face of the blade.

The back portions of the wedges and the seats in which they are engaged are substantially cylindrical in form, as indicated in Fig. 2, so that the wedges may rock in their seats to automatically adjust themselves into flat clamping engagement with the blade.

In the first illustrated form of the invention, Figs. 1 and 2, the wedge seats converge inwardly toward the face of the blade and clamping engagement of the wedges with the blade is effected by drawing the wedges together with a bolt 20 screw threaded in the back wedge 14 at 21 and passing freely through the front wedge 15.

The second form of the invention, illustrated in Figs. 3 and 4, differs from the first in having the wedge seats 16a and 17a relatively inclined away from the face of the blade, thus to mount the part-circular wedges 14a and 15a to operate with a spreading instead of an approaching action, effected in this case by a set screw 22 threaded in the front wedge 15a and bearing against the opposing face of the back wedge 14a.

The second form of construction has certain advantages over the first form, particularly in lessened cost of manufacture.

The flat blade engaging faces of the wedges may be relieved longitudinally or transversely or both longitudinally and transversely, substantially as indicated at 23 in Fig. 5.

Greater simplicity is attained in the form of invention illustrated in Figs. 6 to 9.

The cutter body illustrated at 10a in Figs. 6 and 7 is made with two cylindrical bores 24, 25, which intersect on convergent axes to form cylindrical cavities or seats 16b, 17b, for wedges of the primarily cylindrical form. These cylindrical bores can be inexpensively produced with ordinary end mills or similar boring tools set on inclines convergent away from the blade seat and in position to leave the sides of the bores open to the blade seat at 18a.

The two wedges used with this form of the invention are shown in Figs. 8 and 9, these both being in the form of cylinders with one face cut away on an incline to form an inclined wedge face 19a for engagement with the blade and with the front wedge 15b screw threaded at 26 for the set screw or spreading bolt and the back wedge 14b left plain for engagement by the end of the bolt, as in Fig. 3.

The double acting wedges apply pressure uniformly across substantially the full width of the cutter blade and are able to apply powerful pressure with relatively slight exertion, through operation of the screw for drawing them together or forcing them apart, according to whether the Fig. 1 or the Fig. 3 and Fig. 6 type of construction is employed.

The entire structure is simple and rugged, inexpensive to produce and the number of parts is reduced to a minimum.

What is claimed is:

1. A double wedge lock for inserted blade cutters comprising in combination, a cutter body having a transversely extending blade receiving slot and convergently inclined passages extending through the cutter body from side to side and intersecting one wall of the slot, said passages having circular back walls away from the slot, companion, reversely inclined wedges of corresponding circular form seated in said passages in spaced end-to-end relation and having wedge faces inclined to the axes of said circular form, substantially parallel with the transverse blade receiving slot and projecting through the intersecting sides of said passages into the slot to bear against a blade seated therein and a screw for effecting joint longitudinal wedging movement of said wedges in said passages.

2. A double wedge lock for inserted blade cutters comprising in combination, a cutter body having a transversely extending blade receiving slot and convergently inclined passages extending through the cutter body from side to side and intersecting one wall of the slot, said passages having circular back walls away from the slot, companion, reversely inclined wedges of corresponding circular form seated in said passages in spaced end-to-end relation and having wedge faces inclined to the axes of said circular form, substantially parallel with the transverse blade receiving slot and projecting through the intersecting sides of said passages into the slot to bear against a blade seated therein and a screw for effecting joint longitudinal wedging movement of said wedges in said passages, one of said wedges having a screw seat in which said screw is engaged and said screw having thrust engagement with the other of said wedges.

3. A double wedge lock for inserted blade cutters comprising in combination, a cutter body having a transversely extending blade receiving slot and convergently inclined passages extending through the cutter body from side to side and intersecting one wall of the slot, said passages having circular back walls away from the slot, companion, reversely tapered wedges of corresponding circular form seated in said passages in spaced end-to-end relation and having wedge faces inclined to the axes of said circular form, substantially parallel with the transverse blade receiving slot and projecting through the intersecting sides of said passages into the slot to bear against a blade seated therein and a screw for effecting joint longitudinal wedging movement of said wedges in said passages, said passages being convergently inclined toward said blade receiving slot, said tapered wedges being disposed with their smaller ends inward and their larger ends outward and said screw passing freely through one of said wedges and having screw engagement in the other of said wedges for drawing the wedges together.

4. A double wedge lock for inserted blade cutters comprising in combination, a cutter body having a transversely extending blade receiving slot and convergently inclined passages extending through the cutter body from side to side and intersecting one wall of the slot, said passages having circular back walls away from the slot, companion, reversely tapered wedges of corresponding circular form seated in said passages in spaced end-to-end relation and having wedge faces inclined to the axes of said circular form, substantially parallel with the transverse blade receiving slot and projecting through the intersecting sides of said passages into the slot to bear against a blade seated therein and a screw for effecting joint longitudinal wedging movement of said wedges in said passages, said passages being inclined convergently away from the blade receiving slot and the tapered wedges being disposed with their larger ends inward and their smaller ends outward, said screw being screw threaded through one of said wedges and bearing at its inner end against the other of said wedges.

5. A double wedge lock for inserted blade cutters comprising in combination, a cutter body having a transversely extending blade receiving slot and convergently inclined passages extending through the cutter body from side to side and intersecting one wall of the slot, said passages having circular back walls away from the slot, companion, reversely tapered wedges of corresponding circular form seated in said passages in spaced end-to-end relation and having wedge faces inclined to the axes of said circular form, substantially parallel with the transverse blade receiving slot and projecting through the intersecting sides of said passages into the slot to bear against a blade seated therein and a screw for effecting joint longitudinal wedging movement of said wedges in said passages, said passages being basically cylindrical in form and said wedges being correspondingly basically cylindrical in shape but having the faces of the same toward the blade receiving slot inclined with respect to the axes of the cylindrical formation to form tapered wedge faces operative through the intersected wall of the blade slot.

6. A double wedge lock for inserted blade cutters comprising in combination, a cutter body having a transversely extending blade receiving slot and convergently inclined passages extending through the cutter body from side to side and intersecting one wall of the slot, said passages having circular back walls away from the slot, companion, reversely tapered wedges of corresponding circular form seated in said passages in spaced end-to-end relation and having wedge faces inclined to the axis of said circular form, substantially parallel with the transverse blade receiving slot and projecting through the intersecting sides of said passages into the slot to bear against a blade seated therein and a screw for effecting joint longitudinal wedging movement of said wedges in said passages, said passages being basically cylindrical in form and said wedges being correspondingly basically cylindrical in shape but having the faces of the same toward the blade receiving slot inclined with respect to the axes of the cylindrical formation to form tapered wedge faces operative through the intersected wall of the blade slot, said screw having a screw threaded bearing in one wedge and a thrust applying engagement with the other wedge.

7. A double wedge lock for inserted blade cutters comprising in combination, a cutter body having a transversely extending blade receiving slot and convergently inclined passages extending through the cutter body from side to side and intersecting one wall of the slot, said passages having circular back walls away from the slot, companion, reversely tapered wedges of corresponding circular form seated in said passages in spaced end-to-end relation and having wedge faces projecting through the intersecting sides of said passages into the slot to bear against a blade seated therein and a screw for effecting joint longitudinal wedging movement of said wedges in said passages, said passages being basically cylindrical in form and said wedges being correspondingly basically cylindrical in shape but having the faces of the same toward the blade receiving slot inclined with respect to the axes of the cylindrical formation to form tapered wedge faces operative through the intersected wall of the blade slot, one of said wedges having a screw passage therethrough and said screw being engaged in said passages and extending therethrough into thrust engagement with the opposing end of the other wedge.

8. A double wedge lock for inserted blade cutters comprising in combination, a cutter body having a transversely extending blade receiving slot and convergently inclined cylindrical passages extending through the cutter body from side to side and intersecting one wall of the slot, reversely tapered cylindrical wedges in opposed end-to-end relation in said passages and having reversely inclined wedge faces projecting through the intersecting sides of said passages into the slot, said projecting, inclined wedge faces being in longitudinal alignment to bear uniformly against the face of a cutter blade seated in said slot and a screw having a screw threaded bearing in one wedge and a thrust applying engagement with the other wedge, said projecting wedge faces of the wedges being relieved between the edges of the same to provide barings for engagement with the face of the cutter blade.

FRANK A. HART.

REFERENCES CITED

The following references are of record in the file of this patent:

FOREIGN PATENTS

| Number | Country | Date |
|---|---|---|
| 150,873 | Great Britain | Sept. 16, 1920 |
| 1,969,791 | Great Britain | Aug. 14, 1934 |